No. 834,069. PATENTED OCT. 23, 1906.
C. B. & C. D. McDONALD.
CAN SOLDERING MACHINE.
APPLICATION FILED DEC. 9, 1905.
4 SHEETS—SHEET 1.
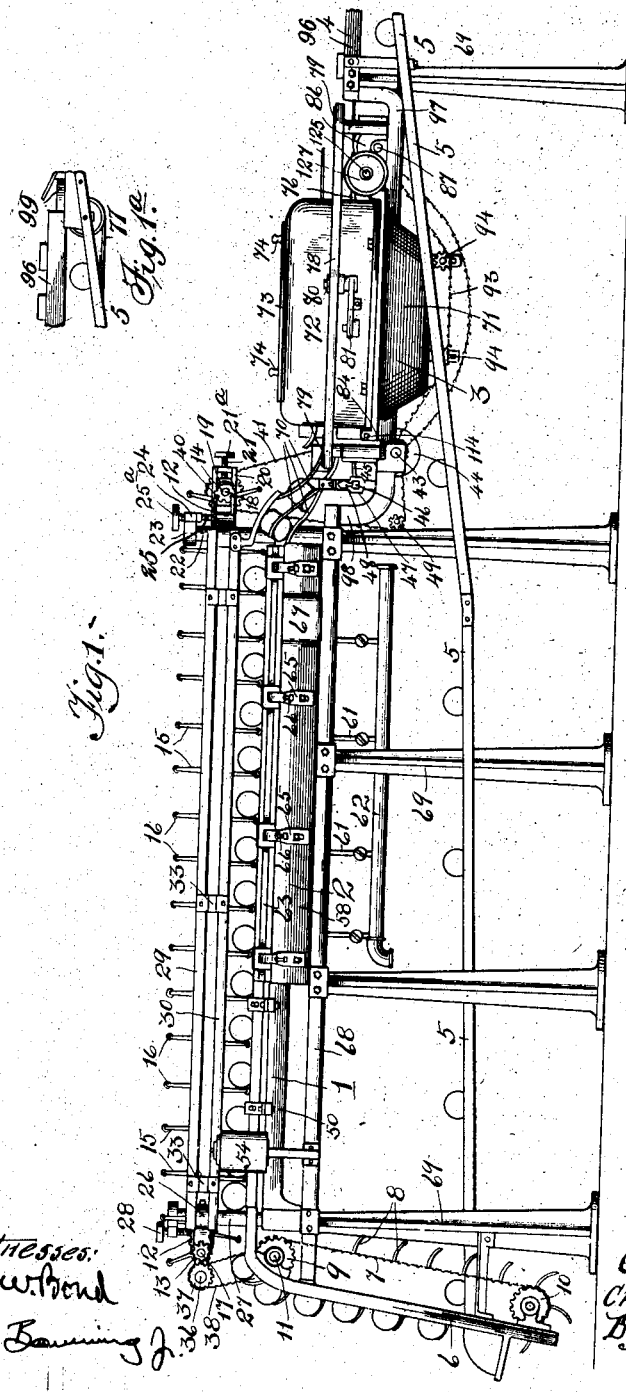
Witnesses:
Oscar W. Bond
J. A. Banning
Inventors.
Charles B. McDonald
Charles D. McDonald
By Banning & Banning
Attys

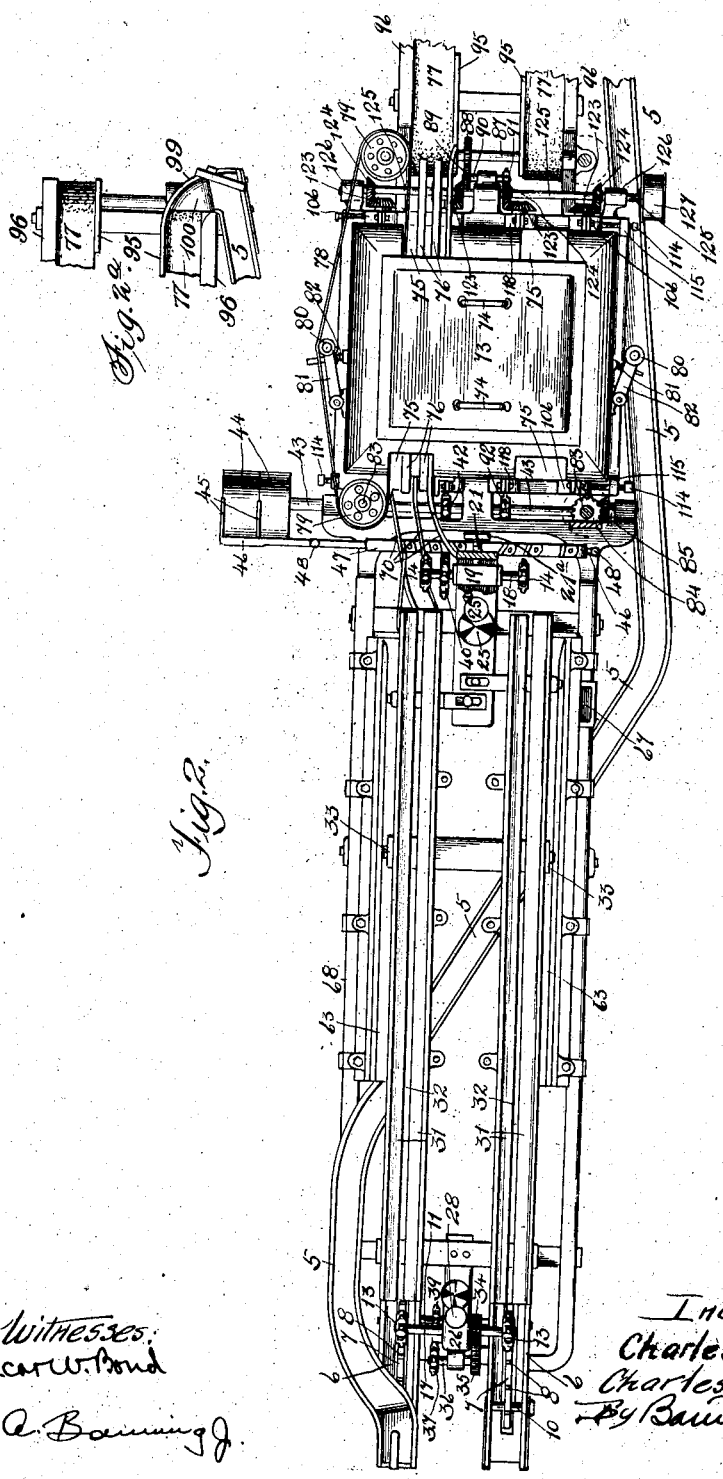

No. 834,069. PATENTED OCT. 23, 1906.
C. B. & C. D. McDONALD.
CAN SOLDERING MACHINE.
APPLICATION FILED DEC. 9, 1905.
4 SHEETS—SHEET 3.
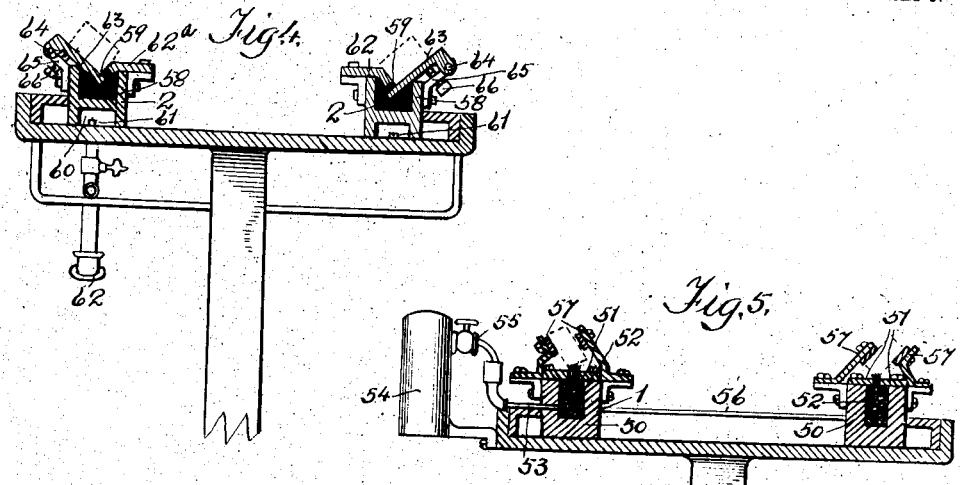
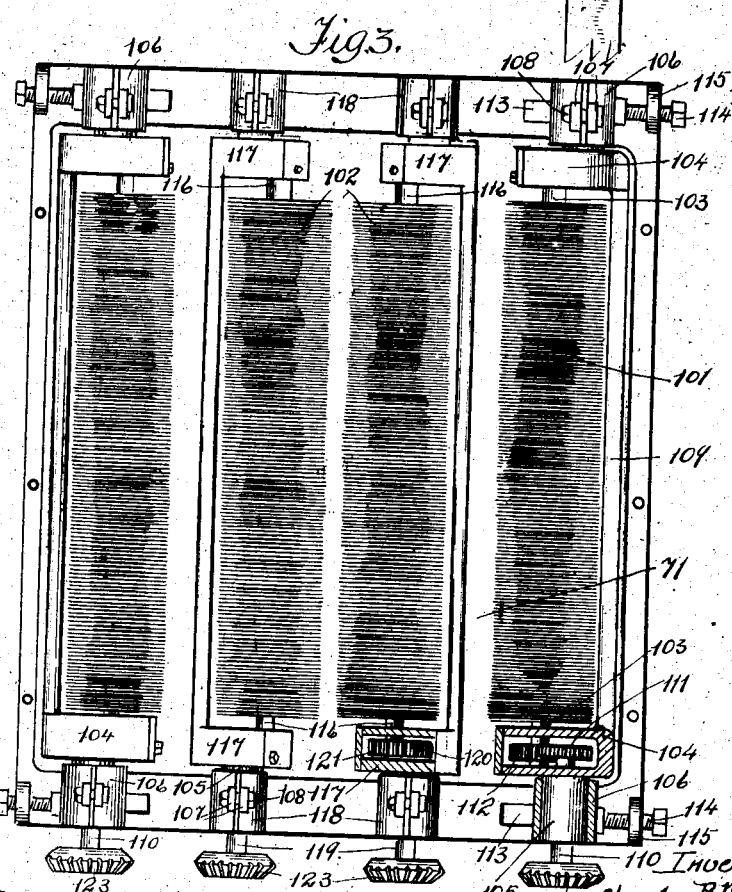
Witnesses:
Inventors:
Charles B. McDonald
Charles D. McDonald
By Banning & Banning
Attys

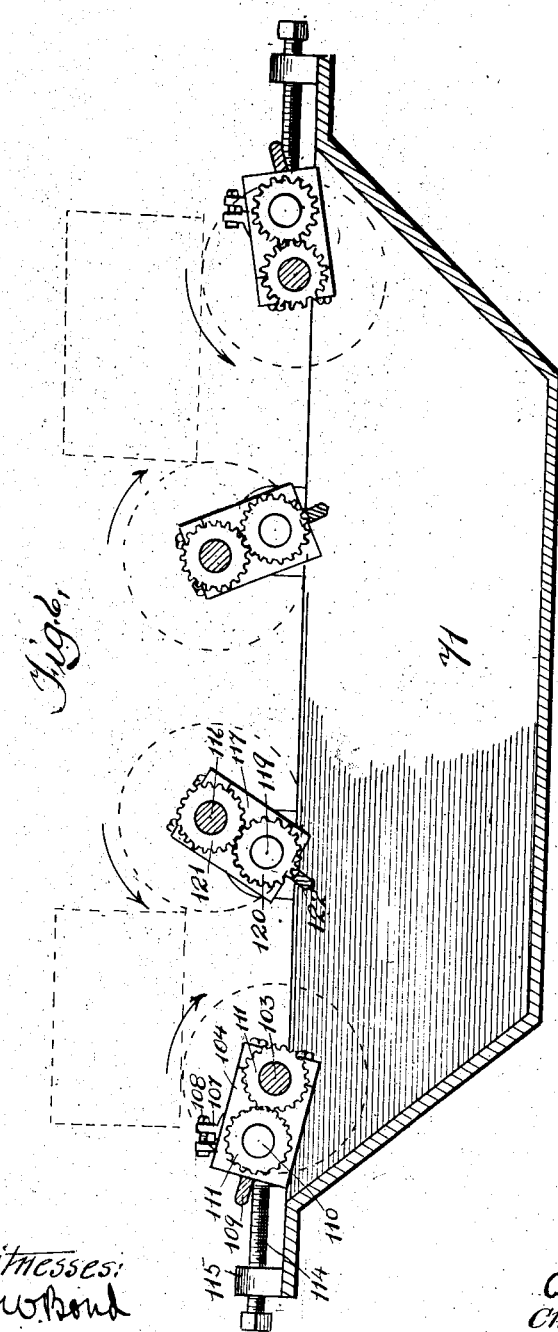

UNITED STATES PATENT OFFICE.

CHARLES B. McDONALD AND CHARLES D. McDONALD, OF CHICAGO, ILLINOIS, ASSIGNORS TO McDONALD MACHINE COMPANY, OF CHICAGO, ILLINOIS, A CORPORATION OF ILLINOIS.

CAN-SOLDERING MACHINE.

No. 834,069.        Specification of Letters Patent.        Patented Oct. 23, 1906.

Application filed December 9, 1905. Serial No. 291,040.

*To all whom it may concern:*

Be it known that we, CHARLES B. McDONALD and CHARLES D. McDONALD, citizens of the United States, residing at Chicago, in the county of Cook and State of Illinois, have invented certain new and useful Improvements in Can-Soldering Machines, of which the following is a specification.

This invention relates to machines for soldering the ends on cans, and has for its primary object to provide means for varying the amount and place of application of the solder to suit the requirements of different kinds of cans.

In soldering some cans it is desirable that the can should be soldered around its side to a greater extent than on its end, whereas in the soldering of other cans it is desirable that the bulk of the solder should be supplied to the ends rather than the sides. By tilting the can to a greater or less degree the mode of application can be varied to suit the requirements of each individual case.

The invention relates to the construction and arrangement of the acid-box, of the solder-box, and of the brush-box. It relates, further, to the general arrangement of the machine as a whole, so that the cans will be automatically coated with acid or resin prior to the soldering, then soldered at the proper point, then passed through the brush-box to have the surplus solder removed by the brushes, and, finally, delivered to a cooling-table, after which the cans roll down a trackway and are delivered to the other side of the machine preparatory to having the opposite ends of the cans treated in a similar manner.

The machine is adapted to automatically solder both ends of the can by a continuous operation and finally deliver the cans clean and ready for use.

The invention relates to the construction, arrangement, and operation of the rotating mechanism for the cans and to the general arrangement and construction of the various parts composing the machine for adapting the machine to operate rapidly and uniformly and with a minimum expenditure of power.

The invention consists in the features of construction and combination of parts hereinafter described and claimed.

In the drawings, Figure 1 is a side elevation of the entire machine, showing the cans in various steps of completion with the terminal portion of the machine broken away; Fig. 1ª, a view showing the portion of the machine broken off from Fig. 1; Fig. 2, a plan view of the same having the terminal portion broken away as in Fig. 1; Fig. 2ª, a view of the terminal portion broken away from Fig. 2; Fig. 3, a view showing the interior of the brush-box; Fig. 4, a cross-sectional view showing the interior arrangement of the solder-box; Fig. 5, a cross-sectional view showing the interior arrangement of the acid or resin boxes; and Fig. 6, a cross-sectional view of the brush-box, showing the method of mounting the gears for operating the brushes.

Referring to Figs. 1 and 2, the machine consists, essentially, of an acid-box 1, to the rear of which is located a soldering-box 2, from which the cans are delivered to a brush-box 3. After leaving the brush-box the cans are delivered to a cooling-table 4 and are discharged onto an inclined trackway 5, extending the entire length of the machine and adapted to deliver the cans at the opposite side of the machine prior to a second passage through the machine.

It will be understood that the acid-box and solder-box are duplicated and that the description hereinafter given applies to both of these boxes.

The cans are initially delivered into a hoist 6, consisting of an endless chain 7, having carriers 8, which are adapted to pass around a power-driven sprocket-wheel 9 at the upper end and an idler sprocket-wheel 10 at the lower end. Hoists are provided for each side of the machine, and both are driven by means of a shaft 11, on the ends of which the sprocket-wheels are mounted.

For purposes of illustration we may consider the right-hand of the machine as adapted to carry the cans through their initial soldering and the left-hand side of the machine as adapted to carry the cans through for their final soldering; but the hoisting mechanism and carrying mechanism is the same on both sides of the machine, and the mechanism is actuated from a single source of power-supply. The cans are carried along the acid and solder boxes by means of an endless chain 12, which passes around sprocket-wheels 13 and 14 at opposite ends, and the carrier sprocket-chain is provided at suitable distances with arms 15, provided at their ends with rollers 16 for contacting the cans and lessening the friction and allowing the cans to roll more uniformly. The sprocket-wheels 13 are mounted upon a shaft 17, and the sprocket-wheels 14 are mounted upon the shaft 18. The shaft 18 is journaled within a movable block 19, mounted within a frame 20, and adapted to be adjusted within the frame as a guideway by means of an adjusting-screw 21 and hand-wheel 21ª, which allows the journal-block to be retracted and the sprocket-chains tightened to any desired degree. The frame 20 at its forward end is slidably mounted upon a post 22, having an enlarged head 23, provided with a lug 24, through which is entered an adjusting-screw 25, which is revolubly held within the frame 20 and has on its end a hand-wheel 25ª, by means of which the vertical elevation of the frame 20 can be regulated when desired. The shaft 17 is journaled within a slidable head 26, mounted upon a post 27 and adjustable thereon by means of a wheel 28, similar in all respects to the wheel 25. The sprocket carrier-chains travel around an upper trackway 29 and a parallel lower trackway 30, each of the trackways formed of angle-bars 31, leaving a slot 32 between them. The upper and lower trackways are connected by means of brackets 33 and held in a suitable elevation above the acid and solder boxes along which the cans are adapted to roll beneath the lower trackway. The shaft 17 has thereon a gear 34, which meshes with a gear 35 on a shaft 36, which latter is provided with a sprocket-wheel 37, carrying a sprocket-chain 38, which passes around a sprocket-wheel 39 on the shaft 11 for actuating the sprocket-wheels 9, which move the hoists. As the carrier sprocket-chains are moved around the upper and lower trackways the hoists will be likewise actuated to deliver the cans which are moved along by the arms 15, space being allowed between the adjacent arms for a single can, and the wheels on the arms serve to minimize the friction and cause a rotation of the cans to distribute the solder evenly and uniformly around the edges. The shaft 18 at the inner end of the carrier-chains has thereon a sprocket-wheel 40, over which passes a sprocket-chain 41, which is actuated by means of a sprocket-wheel 42 on a power-shaft 43. The power-shaft has thereon fast and loose pulleys 44 of the usual character, which are adapted to receive a belt, (not shown,) and the belt passes between the arms 45 of a guide 46, which is slidably mounted within a frame 47, extending transversely of the machine and provided on its opposite ends with handles 48, so that the power can be controlled from either side of the machine. The sprocket-chain 41 passes around an idler pulley-wheel 49, which prevents interference with some of the operating parts of the machine.

The acid-boxes (best shown in Fig. 5) each consists of an elongated box 50, having on its top overhanging flanges 51, leaving a crack between them, and the box is filled with an absorbent substance 52, such as waste or lampwick, which is adapted to be moistened by a suitable acid composition delivered to the absorbent substance through a pipe 53, communicating with an acid-tank 54, having a valve 55 to control the flow of acid. Both of the acid-boxes are supplied from the same tank, a pipe 56 serving to supply the farther acid-box with the necessary acid composition. Each of the acid-boxes is provided on its top with a guide-flange 57, set in oblique relation to the upper surface of the acid-box, between which flanges a can is adapted to roll on its edge. This arrangement brings one edge of the can against the moistened absorbent projecting from the slot between the flanges 51 and moistens the edge of the can as it is rolled along preparatory to being soldered. It will be understood that the guide-flanges on the companion acid-boxes are set or tilted at a reverse angle to one another, so that on the return trip the cans will be held in reverse relation to the position they occupied on the initial trip through the machine, thereby moistening the previously-unmoistened edge of the can preparatory to final soldering.

The solder-boxes are located in line with the acid-boxes, so that the cans are rolled directly from one to the other, as shown in Fig. 4, each of the solder-boxes consisting of a receptacle 58 for containing solder 59, and beneath said receptacle is a heating-space 60, adapted to be heated by burners 61, connecting with a header-pipe 62, which supplies gas or other heating substance to the under portion of the solder-boxes. The solder-boxes are provided with inner flanges 62ª, which overhang the inner walls of the solder-boxes, and the boxes are further provided with outer adjustable plates 63, which are hinged, by means of pivots 64, to fixed flanges 65 on the outer side of the solder-box, which arrangement allows the angle of the plates 63 to be varied by means of adjusting-screws 66. This adjustment serves to tilt the cans to a greater or less degree during their passage over the solder-box, so that the solder may be applied either equally to the bottom and side of the can or to one portion of the can to a greater degree than to the other. The solder is supplied to the solder-box through a feed trough or opening 67 (shown in Figs. 1 and 2) and flows down into place in the solder-boxes, where it is heated by means of the burners previously referred to.

The mechanism heretofore described is suitably supported upon side rails 68, carried by uprights 69 of any suitable character.

As previously mentioned, the cans are fed through the acid and solder boxes on edge to a greater or less degree; but when delivered to the brush-box it is desirable that the cans travel through on their ends rather than their sides, and in order to turn the cans prior to their delivery to the brush-box the cans are made to slide down the inclined slideway at the terminal end of the solder-box, which slideway consists of rods 70, suitably bent or turned so as to twist the can during its descent to the brush-box and deliver the can to the brush-box on its flat end.

The brush-box consists of a lower section 71, having a dished bottom, and an upper or inclosed section 72 of rectangular shape and removably secured to the lower section. The upper section has a removable cover 73, provided with handles 74, which are adapted to be lifted easily, lifting from the upper section to expose the interior of the box. As shown in Fig. 2, the upper section is provided with forward and rear openings 75, which allow the cans to pass entirely through the box, and the cans are delivered to a straight trackway 76, which projects through the openings in the brush-box at either side and is adapted to deliver the cans onto a pair of endless traveling aprons or belts 77 on the cooling-table. The cans are moved through the brush-box by means of an endless belt 78, which passes around belt-wheels 79, and the belt is carried in suitable proximity to the trackway 76 to engage the curved sides of the cans and roll the cans through the brush-box.

The endless belt 78 passes around an idler pulley-wheel 80, carried by a pivoted arm 81, against which bears a spring 82 for outwardly forcing the idler-wheel to exert a tension on the belt and hold the belt tight at all times. The forward pulley-wheels 79 are mounted upon vertical shafts 83, having bevel-pinions 84, which mesh with bevel-pinions 85 on the shaft 43, so that the rotation of the shaft serves to actuate the belt-wheels and belt carried thereby. The carrier-belts 77 are actuated by means of pulley-wheels 86, mounted upon a shaft 87, which shaft is provided with a gear-wheel 88, meshing with a gear-wheel 89 on the stud-shaft 90. The last-mentioned shaft has on its end a sprocket-wheel 91 in alinement with a sprocket-wheel 92 on the shaft 43, which latter sprocket-wheel serves to actuate a sprocket-chain 93, running over idler pulley-wheels 94 beneath the brush-box. It will thus be seen that the power-shaft 43 serves to actuate the hoisting mechanism, the traveling sprocket-chains, the feed-wheels for the brush-box, and the traveling aprons on the cooling-table. The traveling aprons move between inner guide-flanges 95 and outer side rails 96, which latter terminate at their forward ends in depressed rails 97, which support the brush-box and are connected, by means of shoulders 98, with the side rails 68, which support the feed mechanism. The traveling apron on the right-hand side of the cooling-table delivers the cans to a curved guide-wall 99, provided with a floor 100, and the cans are turned as they strike the guide-wall and are thrown on their sides into the runway 5, which is too narrow to permit the insertion of the cans on their ends, which arrangement allows the cans to roll down by gravity, as shown in Fig. 1, and to cross over to the other side of the machine and be delivered to the second hoisting mechanism prior to their final travel through the machine, during which travel the cans will be held in reverse position with respect to the position previously occupied, so that when the cans are finally discharged both ends will be properly soldered.

Within the brush-box are four longitudinally-extending brushes, as shown in Figs. 3 and 6, the outer brushes 101 being positioned slightly below the inner brushes 102. The outer brushes are adapted to clean off the under flat end of the can as it is carried through the brush-box and revolved by the endless belt 78, the inner brushes being adapted to clean off the curved side wall of the can. The outer brushes are carried by journals 103, which are mounted within journal-boxes 104. The journal-boxes are pivotally mounted by means of sleeves 105, which are off center with respect to the brush-journals, and the sleeves are carried within split sockets 106, provided with ears 107, adapted to be clamped together by means of bolts 108, which arrangement allows the journal-boxes to be turned or adjusted to vary the vertical elevation of the outer brushes and after adjustment to be locked in adjusted position by tightening the bolts. In order that the journal-boxes at both ends of the brush may be uniformly adjusted, said journal-boxes are connected by means of a connecting-bar 109, which extends from end to end of the brush at one side thereof. The sleeves 105 at the rear end of the brush-box serve as mountings for shafts 110, which pass through and are journaled within the sleeves. Said shafts have on their inner ends gear-wheels 111, which mesh with gear-wheels 112, carried by the brush-journals 103, which arrangement allows the journal-boxes for the brush-journals to be swung around the power-shafts 110 as axes without throwing the gear-wheels out of mesh. The outer journal-sockets 106 are slidably mounted within slots 113 in the wall of the brush-box and are adjusted by means of set-screws 114, passing through ears 115, which enables the transverse adjustment of the brushes and in combination with the vertical adjustment previously described allows the outer brushes to be adjusted to any desired position with respect to the inner brushes, which maintain a relatively fixed position. The inner brushes 102 are mounted on brush-journals 116, carried within journal-boxes 117, which are similar in all respects to the journal-boxes previously described and are properly tilted, as shown in Fig. 6, to a different vertical elevation. The inner journal-boxes are pivoted within split sockets 118, which are fixedly secured to the brush-box and which journals are similar to those hitherto described. Rotation is imparted to the inner-brush journals through the medium of shafts 119 and intermeshing gear-wheels 120 and 121, similar in all respects to those hitherto described, and the front and rear inner journal-boxes are connected by bars 122, similar in function and general arrangement to the connecting-bars 109. The short gear-shafts 110 and 119 are all provided on their ends with bevel-pinions 123, which are in the same vertical plane and mesh with bevel-pinions 124 on a transversely-extending shaft 125, journaled within brackets 126, and the shaft is provided on one end with a pulley-wheel 127 for imparting rotation thereto.

The operation of the machine will be partially understood from the foregoing description, but may be briefly stated as follows: The cans are fed into the right-hand hoist at the forward end of the machine, which is being constantly driven at a rate of speed uniform with the traveling sprocket-chain, and after being hoisted up onto the trackway formed on the top of the acid-box are rolled along slightly on edge and have one edge smeared with acid or suitable composition to secure the adherence of the solder, and after passing over the acid-box they are rolled onto the solder-box and kept in constant rotation during their travel over the solder-box by the contact of the rollers on the ends of the carrying-arms. The solder in the box projects slightly through the crack or space formed between the guide-plates, which cover the edge of the tilted can with solder, and the application of the solder will be uniform at all points, since the can is being constantly rotated in its travel from one end of the solder-box to the other. After the can has been discharged from the solder-box it will roll down the trackway, as shown in Fig. 1, which trackway is formed to twist the can sufficiently to throw it onto the flat end which has just been soldered, and the can is carried forward by the friction of the endless belt into and through the brush-box. In passing through the brush-box the outer brush on one side, which is rotating in the direction of the arrow in Fig. 6, serves to rub off the surplus solder on the bottom of the can and throw the same down into the body of the brush-box, and the coöperating inner brush, which is moving in reverse relation to the outer brush, acts against the constantly-revolving curved side of the can to remove the surplus solder at that point. In this manner all of the surplus solder will be removed from both the side and bottom of the can and thrown down into the body of the brush-box for future collection and remelting. The relative position of the brushes can be varied to meet the requirements of cans of different size and shape, which adjustment can be quickly and easily made without unmeshing any of the gears or changing the position or adjustment of the operating mechanism. After the cans have passed through the brush-box they are delivered onto the cooling-table and moved along on the endless belt or apron prior to their discharge onto the runway, and during their travel along the cooling-table and down the runway the solder is given a chance to harden prior to the second trip of the can through the machine. The second trip of the can through the machine serves to solder the opposite end, so that after the can has been discharged onto the cooling-table for the second time it will be complete and ready for final discharge at the end of the cooling-table.

It will be seen from the foregoing description that the machine as a whole is simple in construction and that the various mechanisms for feeding the cans through the machine are operated with the expenditure of a slight amount of power, which is applied at a suitable point and is constantly under the control of the operator. The arrangement provides a continuous path of travel for the cans, so that when the cans are finally delivered from the machine they will be in perfect shape and ready for use. The various operations are entirely automatic, and no supervision is required beyond feeding the cans into the machine at a suitable rate and removing the cans after their final discharge from the machine.

Although the invention has been described with considerable particularity as to details and as to the method of feeding the cans along the machine and discharging the cans therefrom and also with respect to the mode of transmitting the power to the various mechanisms, it will be understood that these features can be changed or modified and the power applied and distributed in any suitable manner without departing from the spirit of the invention.

What we claim as new, and desire to secure by Letters Patent, is—

1. In a soldering-machine, a solder-box, means for moving the cans along the solder-box, inner and outer brushes for removing the surplus solder, one set of brushes being adapted to contact the bottom of the can and the other the side of the can, journals on which the brushes are mounted, pivotally-mounted journal-boxes for the journals, outwardly-extending sleeves on the journal-boxes out of axial alinement with the brush-journals, split sockets provided with clamping devices for clamping the sleeves in adjusted position, and mechanism for imparting rotation to the brush-journals in all positions of adjustment, substantially as described.

2. In a soldering-machine, a solder-box, means for moving the can along the solder-box, inner and outer brushes for removing the surplus solder, one set of brushes being adapted to contact the bottom of a can and the other the side of a can, journals on which the brushes are mounted, pivotally-mounted journal-boxes for the journals, and mechanism for actuating the brush-journals in all positions of adjustment, substantially as described.

3. In a soldering-machine, a solder-box, means for moving the can along the solder-box, inner and outer brushes for removing the surplus solder, one set of brushes being adapted to contact the bottom of a can and the other the side of a can, journals on which the brushes are mounted pivotally-mounted journal-boxes for the journals, gear-wheels on the brush-journals, power-shafts in line with the axes of the journal-boxes and gear-wheels on said power-shafts meshing with the gear-wheels on the brush-journals, substantially as described.

4. In a soldering-machine, the combination of a solder-box provided with a top guideway adjustable to different angles, a feed mechanism for carrying cans along the solder-box and simultaneously rotating the same, a brush-box, a guideway leading from the solder-box to the brush-box and adapted to throw down the can onto its flat end, means for simultaneously rotating and moving the cans through the brush-box, coöperating brushes adapted to clean off the side and bottom of the cans, and means for adjusting the brushes with respect to one another, substantially as described.

5. In a soldering-machine, the combination of a solder-box provided with a top guideway adjustable to different angles, a feed mechanism for carrying cans along the solder-box and simultaneously rotating the same, a brush-box, a guideway leading from the solder-box to the brush-box and adapted to throw down the can onto its flat end, means for simultaneously rotating and moving the cans through the brush-box, coöperating brushes adapted to clean off the side and bottom of the cans, journals for the brushes, journal-boxes carrying the journals, said boxes being pivoted off center with respect to the journals, power-shafts in line with the pivotal mounting for the journal-boxes, and intermeshing gear-wheels on the power-shafts and brush-journals for imparting rotation to the latter regardless of their adjustment, substantially as described.

6. In a soldering-machine, a solder-box consisting of a body adapted to contain solder, a guide-flange overhanging the body and adapted to be adjusted to different angles, and a coöperating flange leaving a narrow opening for the outlet of the solder, substantially as described.

7. In a soldering-machine, a solder-box consisting of a body adapted to contain solder, a guide-flange overhanging the body and adapted to be adjusted to different angles, a coöperating flange leaving a narrow opening for the outlet of the solder, an acid-box in front of and in line with the solder-box, and means for feeding cans continuously from the acid-box to the solder-box, substantially as described.

8. In a soldering-machine, a solder-box consisting of a body adapted to contain solder, a guide-flange overhanging the body and adapted to be adjusted to different angles, a coöperating flange leaving a narrow opening for the outlet of the solder, an acid-box in front of and in line with the solder-box, an endless belt traveling above the acid and solder boxes and provided with arms having on their ends rollers adapted to contact the cans and rotate the same along the acid and solder boxes, substantially as described.

9. In a soldering-machine, a brush-box, inner and outer brushes extending longitudinally thereof, journals upon which the brushes are mounted, journal-boxes for the journals each provided with an outwardly-extending sleeve off center with respect to the brush-journals, sockets surrounding the sleeves, means for holding the sleeves in adjusted position within the sockets, gear-wheels on the brush-journals, power-shafts passing through the sleeves in line with the axes of the journal-boxes, and gear-wheels on said shafts meshing with the gear-wheels on the brush-journals, substantially as described.

10. In a soldering-machine, the combination of a brush-box, inner and outer brushes extending longitudinally thereof, journals on which the brushes are mounted, journal-boxes for the journals, outwardly-extending sleeves for the journal-boxes, split sockets in which the sleeves are pivotally mounted, bolts for clamping the split sockets around the sleeves, power-shafts entering the sleeves, gear-wheels on the end of the power-shafts, and gear-wheels on the brush-journals meshing with the first-mentioned gear-wheels, substantially as described.

11. In a soldering-machine, the combination of a brush-box, inner and outer brushes extending longitudinally thereof, journals on which the brushes are mounted, journal-boxes for the journals, outwardly-extending sleeves for the journal-boxes, split sockets in which the sleeves are pivotally mounted, bolts for clamping the split sockets around the sleeves, power-shafts entering the sleeves, gear-wheels on the end of the power-shafts, gear-wheels on the brush-journals meshing with the first-mentioned gear-wheels, bevel-pinions on the ends of the power-shafts, a power-transmission shaft and bevel-pinions thereon meshing with the first-mentioned bevel-pinions and adapted to rotate the brushes in opposite direction with respect to one another, substantially as described.

CHARLES B. McDONALD.
   CHARLES D. McDONALD

Witnesses:
 WALKER BANNING
 OSCAR W. BOND.